US012794754B2

(12) United States Patent
Sukovich et al.

(10) Patent No.: US 12,794,754 B2
(45) Date of Patent: Nov. 10, 2026

(54) REAL-TIME SECURED DYNAMIC INFORMATION STANDARDIZATION IN DISTRIBUTED ENVIRONMENTS USING LARGE LANGUAGE MODELS

(71) Applicant: Bank of America Corporation, Charlotte, NC (US)

(72) Inventors: Michael Sukovich, Milford, PA (US); Vinod Maghnani, Gurugram (IN); Divya Nagarajan, Chennai (IN); Sudha Ganapathy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/174,189

(22) Filed: Apr. 9, 2025

(65) Prior Publication Data

US 2026/0322675 A1 Oct. 15, 2026

(51) Int. Cl.

*H04L 41/0213* (2022.01)
*G06N 10/70* (2022.01)
*H04L 41/16* (2022.01)

(52) U.S. Cl.

CPC ......... *H04L 41/0213* (2013.01); *G06N 10/70* (2022.01); *H04L 41/16* (2013.01)

(58) Field of Classification Search

CPC ...... H04L 41/0213; H04L 41/16; G06N 10/70
See application file for complete search history.

(56) References Cited

U.S. PATENT DOCUMENTS

| | | | |
|---|---|---|---|
| 12,271,169 B2 * | 4/2025 | Cella | G06N 10/80 |
| 12,271,376 B1 | 4/2025 | Liao et al. | |
| 12,271,394 B1 * | 4/2025 | Sylvester | G06F 16/904 |
| 12,271,818 B1 | 4/2025 | Denolf et al. | |
| 12,271,867 B1 | 4/2025 | Olmstead et al. | |
| 12,271,869 B2 | 4/2025 | Leaman et al. | |
| 12,271,878 B1 | 4/2025 | Dutt et al. | |
| 12,271,898 B1 | 4/2025 | Arvanaghi et al. | |
| 12,273,408 B1 | 4/2025 | Fitzgerald et al. | |
| 2003/0101251 A1 * | 5/2003 | Low | H04L 41/20 709/223 |

(Continued)

FOREIGN PATENT DOCUMENTS

WO WO-2023101371 A1 * 6/2023 ........... H04L 9/0858

*Primary Examiner* — Richard G Keehn
(74) *Attorney, Agent, or Firm* — Banner & Witcoff, Ltd.

(57) ABSTRACT

Aspects related to real-time secured dynamic information standardization in distributed environments using large language models are provided. A standardization platform may receive compliance information. The platform may train a standardization model based on the compliance information and based on large language model training sets. The platform may receive message information. The platform may standardize the message information by causing the standardization model to encode and decode the message information. The platform may store the standardized message information in cloud-based storage containers. The platform may generate a photon pairing for a message included in the message information. The platform may validate a destination address indicated by the photon pairing. The platform may transform the message. The platform may send the message to the destination address. The platform may update the standardization model.

20 Claims, 8 Drawing Sheets

(56) References Cited

U.S. PATENT DOCUMENTS

| | | | | |
|---|---|---|---|---|
| 2018/0034888 | A1* | 2/2018 | Cohen | H04L 41/046 |
| 2020/0067789 | A1* | 2/2020 | Khuti | H04L 41/16 |
| 2024/0204887 | A1* | 6/2024 | Rijsman | G06N 10/70 |
| 2025/0077932 | A1* | 3/2025 | Kenemer | G06N 10/70 |
| 2025/0110710 | A1 | 4/2025 | Makhija et al. | |
| 2025/0110746 | A1* | 4/2025 | Platais | G06F 9/3869 |
| 2025/0110765 | A1 | 4/2025 | Thunuguntla et al. | |
| 2025/0110865 | A1 | 4/2025 | Gottiparthy | |
| 2025/0111238 | A1 | 4/2025 | Islam et al. | |
| 2025/0111288 | A1 | 4/2025 | Zhang et al. | |
| 2025/0111656 | A1 | 4/2025 | Narasimha Murthy et al. | |
| 2025/0112849 | A1* | 4/2025 | Chander | H04L 45/04 |
| 2025/0112907 | A1 | 4/2025 | McGuinness et al. | |
| 2025/0112950 | A1 | 4/2025 | Islam et al. | |
| 2025/0259044 | A1* | 8/2025 | Crabtree | G06N 10/60 |
| 2025/0357011 | A1* | 11/2025 | Abdollahian | G16H 50/50 |
| 2026/0128872 | A1* | 5/2026 | King | G06F 21/602 |

* cited by examiner

REAL-TIME SECURED DYNAMIC INFORMATION STANDARDIZATION IN DISTRIBUTED ENVIRONMENTS USING LARGE LANGUAGE MODELS

BACKGROUND

Aspects described herein are related to real-time secured dynamic information standardization in distributed environments using large language models. In some instances, entities such as an enterprise organization (e.g., a financial institution, and/or other institutions) may manage large sets of information and transfer the information in real-time. The real-time data transfers may require compliance with certain standards related to messages, networks, and/or devices. The real-time data transfers may also require interoperability between systems, such as between storage systems local to a platform working to ensure compliance with the standards and cloud-based remote storage systems. Conventional systems lack the capability to ensure smooth interoperability between the different devices while maintaining the requisite standards. Accordingly, there exists a need for a scalable and secure solution for providing real-time information standardization, particularly in distributed environments where large sets of information are managed across a number of different types of devices.

SUMMARY

Aspects of the disclosure provide effective, efficient, scalable, secure, and convenient technical solutions that address and overcome the technical problems associated with current methods of achieving information standardization. In accordance with one or more arrangements of the disclosure, a computing platform with at least one processor, a communication interface, and memory storing computer-readable instructions may receive, from the compliance device, compliance information. The compliance information may include a plurality of rules for message standardization. The computing platform may train a standardization model to standardize inputted message information. The computing platform may train the standardization model ed on the compliance information and one or more large language model training sets. The computing platform may receive, from a first device, message information. The message information may include records of one or more event processing requests. The computing platform may standardize, based on inputting the message information into the standardization model, the message information by causing the standardization model to encode and decode the message information. The computing platform may store the standardized message information in one or more cloud-based storage containers. The computing platform may retrieve, from the one or more cloud-based storage containers, a message for routing to a destination. The computing platform may generate a photon pairing for the message. The photon pairing may include comprises a first photon corresponding to the message and a second photon corresponding to a destination of the message. The computing platform may validate, based on the photon pair, the destination of the message. The computing platform may transform the message using the standardization model. Transforming the message may include encoding the message in a format for the destination of the message. The computing platform may send, to the destination of the message, the message. The computing platform may update, based on sending the message, the standardization model.

In one or more examples, the computing platform may cause, based on sending the message, output of a display. The computing platform may receive, based on the output of the display, a confirmation notification for an event processing request associated with the message. The updating the standardization model may be based on the confirmation notification.

In one or more arrangements, the first device may be or include a data lake located at a premises of the computing platform. In one or more examples, the destination of the message may be or include a cloud data lake. In one or more arrangements, the computing platform may generate the photon pairing based on executing a quantum search algorithm.

In one or more examples, the computing platform may generate the photon pairing by identifying, from a set of networks in a distributed environment, a network destination matching a set of compliance rules corresponding to a domain type of the message. In one or more arrangements, the computing platform may validate the destination of the message by confirming whether transfer of a message from the first device to the destination of the message complies with a network standardization protocol.

In one or more examples, the computing platform may transform the message by decoding, from a cloud storage format and prior to the encoding in the format for the destination of the message, the message. In one or more arrangements, the computing platform may store the standardized message information in the one or more cloud-based storage containers based on one or more domain types corresponding to the standardized message information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
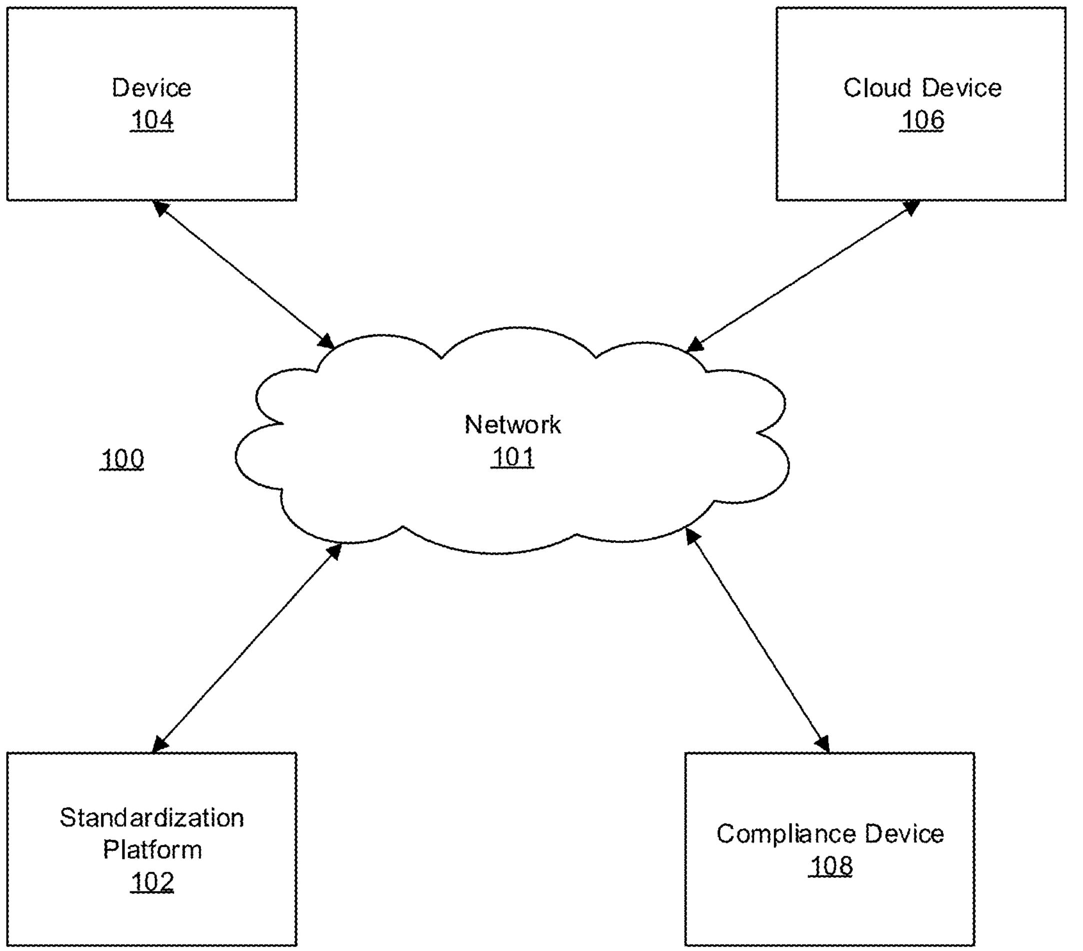
FIGS. 1A-1B depict an illustrative computing environment for real-time secured dynamic information standardization in distributed environments using large language models in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

It is noted that various connections between elements are discussed in the following description. It is noted that these connections are general and, unless specified otherwise, may be direct or indirect, wired or wireless, and that the specification is not intended to be limiting in this respect.

Aspects described herein are related to real-time secured dynamic information standardization in distributed environments using large language models. In some instances, entities such as an enterprise organization (e.g., a financial institution, and/or other institutions) may be subject to a number of different regulations and compliance rules associated with electronic message standards, network standards, and/or other compliance standards. These entities may also manage large sets of information transferred between a number of different data structures and systems. Many of the different data structures and systems may be subject to different compliance standards. For example, a data structure such as an on-premises data lake storing event processing information for the entity may be subject to different compliance standards than a cloud-based data lake storing the same or similar event processing information. Conventional systems lack the capacity and features necessary to ensure smooth interoperability between the different devices while meeting compliance standards associated with large enterprise organizations (e.g., a financial institution, and/or other institutions). Conventional systems also lack the infrastructure to implement a scalable solution to the interoperability issue (i.e., a solution that can be implemented across the broad range of systems associated with large enterprise organizations). Systems that are unable to provide smooth interoperability between the different devices while meeting compliance standards also pose security risks to the managed information, as many compliance standards are configured to provide information security. Therefore, there exists a need for an efficient and scalable solution to ensuring compliance standards, for managing large sets of information transferred between a number of different data structures and systems, are met.

Accordingly, in some instances, entities such as an enterprise organization (e.g., a financial institution, and/or other organizations/institutions) may deploy, maintain, and/or otherwise utilize a standardization platform leveraging large language model techniques to provide improvements to the security, reliability, and scalability of information management systems, particularly in a distributed environment where different devices with different compliance standards must interact with each other. The use of large language models provides the scalability improvements because, unlike other machine learning models, large language models are capable of processing the large sets of information described herein to generate standardized message information.

A standardization platform as described herein may perform standardization of message information based on compliance rules. For example, the standardization platform may encode and decode message information using encoding/decoding operations that comply with message standards, device standards, network standards, and/or other standards corresponding to the domain type of the message information, the source network or device of the message information, the destination network or device of the message information, and/or other parameters. The standardization platform may be a cloud-based platform that stores the message information in one or more cloud-based containers after initially processing the message information to comply with standards associated with the source of the message information. The standardization platform may retrieve messages from the cloud-based containers for later routing to a destination network. In order to determine the destination network, the standardization platform may generate photon pairings (e.g., based on application of quantum algorithms, such as Grover's algorithm, or similar processes) representing the message and an identified destination network. The standardization platform may further provide the security benefits described above by validating the destination network using the photon pairings and transforming messages paired with valid destination networks into a format that complies with standards associated with the destination networks. Accordingly, the standardization platform may provide secure and accurate transfer of message information from a source device (e.g., an on-premises data lake) to a destination device (e.g., a cloud data lake).

In some examples, in performing the methods of deploying and/or utilizing the standardization platform as described herein, the standardization platform may train one or more machine learning models. For example, the standardization platform may train a large language model (i.e., a standardization model) to perform the encoding/decoding of message information and transform the message information and/or messages into formats that comply with certain standards. The standardization platform may train the standardization model to perform standardization of message information based on compliance rules and based on one or more additional large language model training sets. For example, the additional training sets may configure the standardization model to perform encoding and decoding operations that comply with message standards, device standards, network standards, and/or other standards.

These and various other aspects will be discussed more fully herein.

Figure 1B:
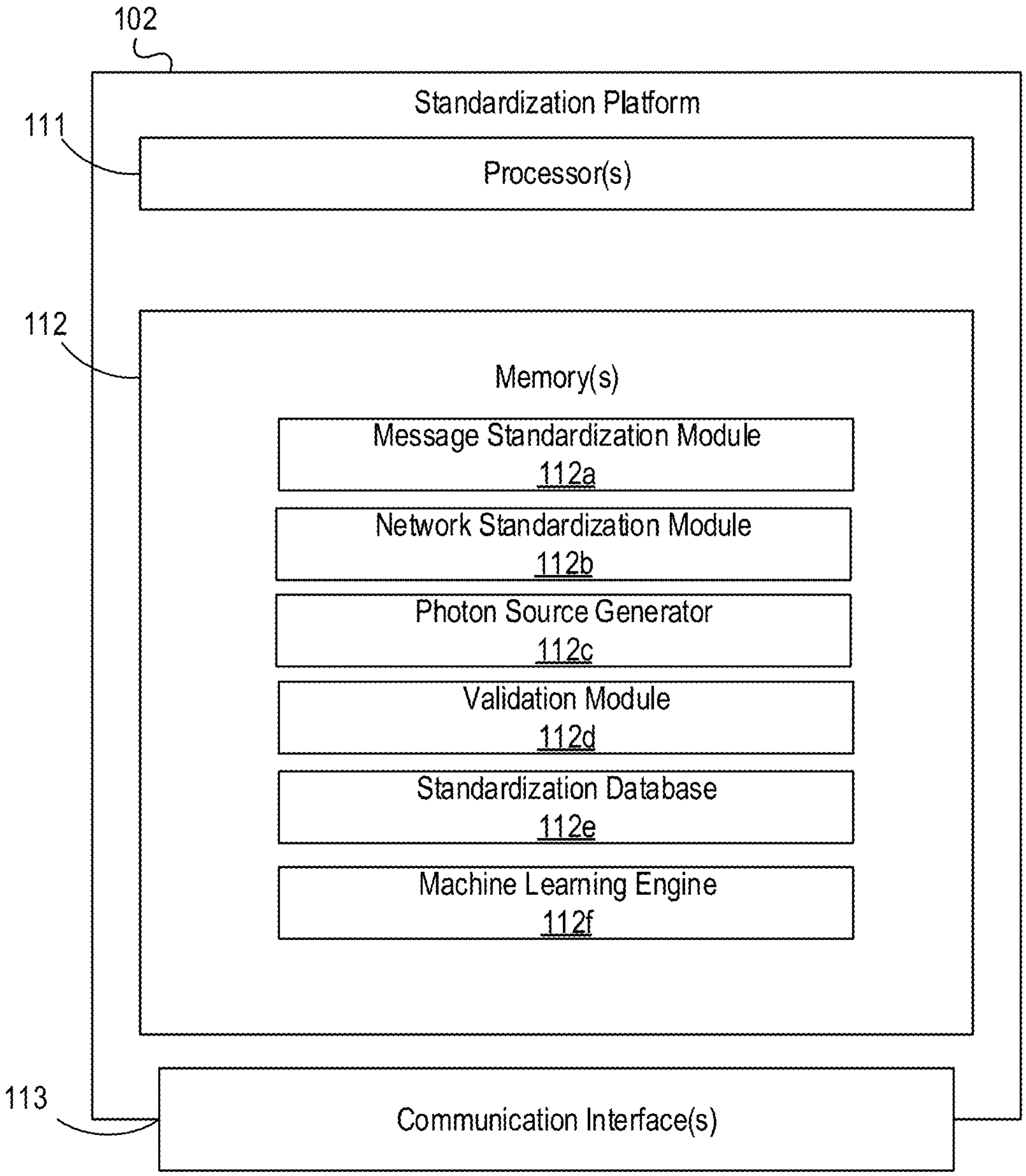

FIGS. 1A-1B depict an illustrative computing environment for real-time secured dynamic information standardization in distributed environments using large language models in accordance with one or more example arrangements. Referring to FIG. 1A, computing environment 100 may include one or more computer systems. For example, computing environment 100 may include a standardization platform 102, a device 104, a cloud device 106, a compliance device 108, and/or other computer systems.

As described further below, standardization platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train, and/or execute one or more machine learning models (e.g., a standardization model, such as a large language model configured to perform techniques for achieving message standardization and compliance standardization). For example, the standardization platform 102 may train a standardization model to perform message standardization, such as by encoding message information, decoding message information, and/or performing other functions described herein. The standardization platform 102 may train the standardization model using training sets of information associated with large language models. The standardization platform 102 may be managed by and/or otherwise associated with an enterprise organization (e.g., a financial institution, and/or other institutions) that may, e.g., be associated with one or more additional devices or systems (e.g., device 104, cloud device 106, compliance device 108, and/or other systems). In one or more instances, the standardization platform 102 may be configured to communicate with one or more devices or systems (e.g., device 104, cloud device 106, compliance device 108, and/or other systems) to perform an information transfer, train large language models, store standardized message information, generate photon pairings, perform validation of information (e.g., message destinations), and/or perform other functions. In one or more examples, the standardization platform 102 may comprise, host, generate, and/or otherwise control a cloud-based environment (e.g., one or more cloud-based storage containers).

The device 104 may be a computing device (e.g., server, server blade, and/or other device) and/or other data storing or computing component (e.g., processors, memories, communication interfaces, databases) that may be used to transfer information between devices (e.g., message information such as records of event processing requests, and/or other information), create, host, modify, and/or otherwise validate an organized collection of information in its natural and/or raw format (e.g., a data lake), and/or perform other functions. The information stored at device 104 may include information stored in multiple natural and/or raw formats (e.g., structured information, unstructured information, semi-structured information, and/or other formats). The device 104 may be accessible by multiple users (who may, e.g., be employees or clients of an enterprise organization such as a financial institution). The device 104 may include one or more clusters of nodes associated with performing different functions within device 104 (e.g., running parallel computations on information stored in device 104, loading information into the relevant cluster, generating instructions for processing information, and/or other functions). The device 104 may be physically located at a premises associated with the standardization platform 102.

The cloud device 106 may be a computing device (e.g., server, server blade, and/or other device) and/or other data storing or computing component (e.g., processors, memories, communication interfaces, databases) that may be used to transfer information between devices (e.g., message information such as records of event processing requests, and/or other information), create, host, modify, and/or otherwise validate an organized collection of information in its natural and/or raw format (e.g., a data lake), and/or perform other functions. The cloud device 106 may, in some examples, be and/or include one or more components configured to host, support, communicate with, and/or otherwise manage a virtual infrastructure, such as a virtual cloud-based server. In some examples, the virtual cloud-based server may additionally or alternatively transfer information between devices (e.g., message information such as records of event processing requests, and/or other information), create, host, modify, and/or otherwise validate an organized collection of information in its natural and/or raw format (e.g., a data lake), and/or perform other functions. The information stored at cloud device 106 and/or the virtual infrastructure (e.g., a cloud data lake) may include information stored in multiple natural and/or raw formats (e.g., structured information, unstructured information, semi-structured information, and/or other formats). The cloud device 106 may be accessible by multiple users (who may, e.g., be employees or clients of an enterprise organization such as a financial institution). The cloud device 106 may include one or more clusters of nodes associated with performing different functions within cloud device 106 (e.g., running parallel computations on information stored in cloud device 106, loading information into the relevant cluster, generating instructions for processing information, and/or other functions). The cloud device 106 may be physically located at a premises remote from the standardization platform 102 and/or may be, or be associated with, a virtual infrastructure as described herein.

The compliance device 108 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information (e.g., compliance information) between devices and/or perform other user functions. The compliance device 108 may, in some examples, include one or more components configured to host, support, communicate with, and/or otherwise manage a virtual infrastructure, such as a virtual cloud-based server. In some examples, the virtual cloud-based server may additionally or alternatively be configured to transfer information (e.g., compliance information, and/or other information) between devices. The compliance device 108 may be a computing device as described herein, storing compliance information (e.g., rules, regulations, or the like).

Computing environment 100 also may include one or more networks, which may interconnect standardization platform 102, device 104, cloud device 106, and compliance device 108. For example, computing environment 100 may include a network 101 (which may interconnect, e.g., standardization platform 102, device 104, cloud device 106, and compliance device 108).

In one or more arrangements, standardization platform 102, device 104, cloud device 106, and compliance device 108 may be any type of computing device capable of sending and/or receiving requests and processing the requests accordingly. For example, standardization platform 102, device 104, cloud device 106, compliance device 108 and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of standardization platform 102, device 104, cloud device 106, and compliance device 108 may, in some instances, be special-purpose computing devices configured to perform specific functions.

Referring to FIG. 1B, standardization platform 102 may include one or more processors 111, memory 112, and communication interface 113. A data bus may interconnect processors 111, memory 112, and communication interface 113. Communication interface 113 may be a network interface configured to support communication between standardization platform 102 and one or more networks (e.g., network 101, or the like). Communication interface 113 may be communicatively coupled to the processors 111. Memory 112 may include one or more program modules having instructions that, when executed by processors 111, cause standardization platform 102 to perform one or more functions described herein, and/or one or more databases (e.g., a standardization database 112*e*, or the like) that may store and/or otherwise maintain information which may be used by such program modules and/or processors 111. In some instances, the one or more program modules and/or databases may be stored by and/or maintained in different memory units of standardization platform 102 and/or by different computing devices that may form and/or otherwise make up standardization platform 102. For example, memory 112 may have, host, store, and/or include a message standardization module 112*a*, a network standardization module 112*b*, a photon source generator 112*c*, a validation module 112*d*, a standardization database 112*e*, a machine learning engine 112*f*, and/or other modules and/or databases.

Message standardization module 112*a* may have instructions that direct and/or cause standardization platform 102 to provide message standardization to information in a distributed environment. For example, message standardization module 112*a* may have instructions that direct and/or cause the standardization platform 102 to receive compliance rules, receive message information (e.g., for transfer in the distributed environment), standardize the message information using a standardization model, and/or perform other functions. Network standardization module 112*b* may have instructions that direct and/or cause standardization platform 102 to ensure message information complies with network standards (e.g., security standards, or the like). For example, network standardization module 112*b* may have instructions that direct and/or cause the standardization platform 102 to store standardized message information in cloud-based containers, retrieve stored messages for routing, and/or perform other functions. Photon source generator 112*c* may have instructions that facilitate network standardization. For example, photon source generator 112*c* may have instructions that direct and/or cause the standardization platform 102 to perform a quantum search, generate photon pairings for messages, and/or perform other functions. Validation module 112*d* may have instructions that direct and/or cause the standardization platform 102 to provide additional security benefits by validating destinations for message information. For example, validation module 112*d* may have instructions that direct and/or cause the standardization platform 102 to validate a destination address, transform message information into a format corresponding to a destination address, send transformed messages, cause output of a user interface, and/or perform other functions. Standardization database 112*e* may have instructions causing standardization platform 102 to store (e.g., in memory 112) correlations and/or information used to train machine learning models, instructions or information for maintaining a virtual or cloud-based architecture, standardized message information, and/or other information. Machine learning engine 112*f* may have instructions to train, implement, and/or update one or more machine learning models, such as a standardization model, and/or other machine learning models. Although message standardization module 112*a*, network standardization module 112*b*, photon source generator 112*c*, validation module 112*d*, standardization database 112*e*, and machine learning engine 112*f* are depicted as separate modules herein, the instructions stored by these modules may be stored in any number of modules without departing from the scope of this disclosure.

Figure 2A:
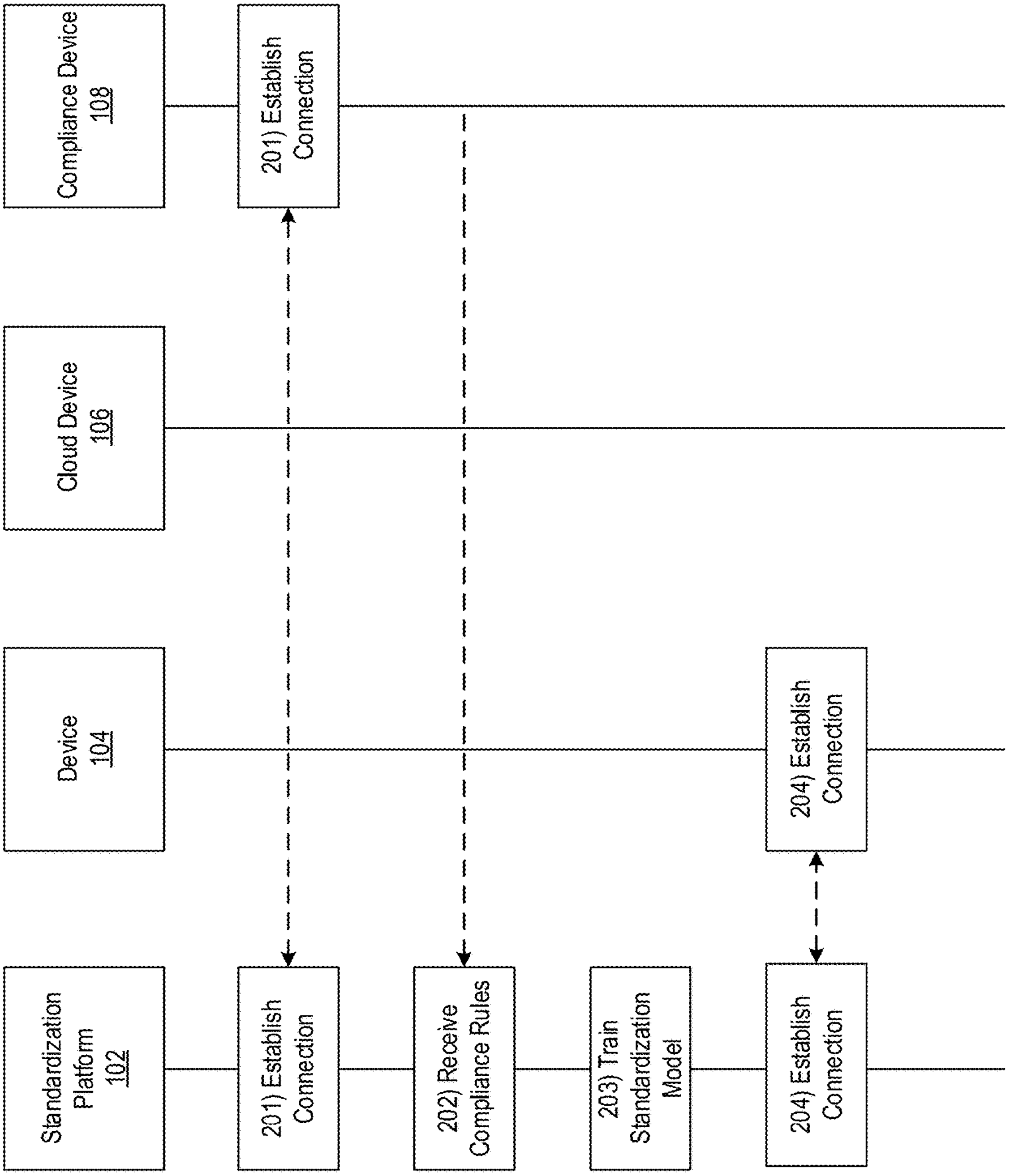
FIGS. 2A-2D depict an illustrative event sequence for real-time secured dynamic information standardization in distributed environments using large language models in accordance with one or more example arrangements.

FIGS. 2A-2D depict an illustrative event sequence for real-time secured dynamic information standardization in distributed environments using large language models in accordance with one or more example arrangements. Referring to FIG. 2A, at step 201, the standardization platform 102 may establish a connection with the compliance device 108. For example, the standardization platform 102 may establish a first wireless data connection with the compliance device 108 to link the compliance device 108 with the standardization platform 102 (e.g., in preparation for receiving compliance rules, and/or to perform other functions). In some instances, the standardization platform 102 may identify whether or not a connection is already established with the compliance device 108. If a connection is already established with the compliance device 108, the standardization platform 102 might not re-establish the connection. If a connection is not yet established with the compliance device 108, the standardization platform 102 may establish the first wireless data connection as described herein. In some examples, the standardization platform 102 may establish the first wireless data connection using one or more communication interfaces (e.g., communication interface 113, or the like). In some examples, the compliance device 108 may host, support, communicate with, and/or otherwise manage a virtual infrastructure, such as a virtual cloud-based server. In these examples, the standardization platform 102 may establish the first wireless data connection by establishing communications between communication interface 113 and the virtual cloud-based server (e.g., via a cloud-based network, such as network 101 and/or other networks).

At step 202, the standardization platform 102 may receive compliance rules. For example, the standardization platform 102 may receive compliance rules from the compliance device 108 (e.g., via the communication interface 113 and while the first wireless data connection is established). The compliance rules may include rules, standards, requirements, or the like associated with providing secure transmission of information over particular networks (e.g., the Internet, and/or other networks). The compliance rules may include a compilation of rules from a variety of sources. For example, the compliance rules may include compliance rules associated with regulatory organizations, government organizations, or the like. The compliance rules may include information associated with complying with message transmission standards for particular enterprises, such as an enterprise associated with the enterprise organization managing the standardization platform 102.

At step 203, the standardization platform 102 may train and/or otherwise configure a standardization model. For example, the standardization platform 102 may train and/or otherwise configure, using the machine learning engine 112*f* and based on one or more training sets of information, the standardization model to perform encoding and decoding to achieve message standardization, based on input of message information. The standardization platform 102 may train and/or otherwise configure the standardization model by providing the one or more training sets as input. The one or more training sets may be stored in memory of the standardization platform 102 (e.g., memory 112). Additionally or alternatively, in some instances, the training sets of information may be retrieved by the standardization platform 102 from different sources, such as a network (e.g., the Internet), a local database or other repository, and/or other sources. In some examples, the standardization platform 102 may have previously received the training sets of information from a user device, such as the device 104, the cloud device 106, and/or other devices. The training sets of information may include information corresponding to message standardization. For example, the training sets of information may include templates, instructions, or the like corresponding to different techniques for encoding and decoding message information. The standardization platform 102 may train and/or otherwise configure the standardization model, based on the one or more training sets, to encode and decode message information being transferred from one device to another based on one or more compliance rules (e.g., as described further herein). For example, the standardization platform 102 may train and/or otherwise configure the categorization model to encode message information in a first format according to one or more compliance rules and decode the message information for storage at the standardization platform 102 according the same compliance rules and/or different compliance rules. The standardization platform 102 may additionally train and/or otherwise configure the standardization model to decode stored and standardized message information from a format associated with the standardization platform 102 and encode the standardized message information in a format associated with a secure destination address.

In some examples, the standardization platform 102 may further train and/or otherwise configure the standardization model by providing the compliance rules as an additional training input. For example, by providing the compliance rules as an additional input, the standardization platform 102 may train and/or otherwise configure the standardization model to apply the encoding and decoding techniques learned by the standardization model from the one or more training sets based on the compliance rules. In some examples, the standardization platform 102 may train the standardization model to selectively apply different encoding/decoding techniques based on the type, content, format, and/or other properties of message information provided as an input as described further herein depending on the compliance rule or compliance rules associated with the type, content, format, and/or other properties of the message information.

In some examples, the standardization model may be a large language model. In these examples, the one or more training sets may include a volume of information sufficient to train a large language model and exceeding an amount of information that other machine learning models are capable of processing. By training the standardization model as described herein, the standardization platform 102 may provide improved security for transmission of message information by introducing multiple failsafe measures for ensuring adherence to the compliance rules. For example, by training and/or otherwise configuring the standardization model based on the training sets of information and the compliance rules, the standardization platform 102 may provide the security benefits described herein by ensuring message information is transferred between secured devices in secure formats. By using a large language model as the standardization model, the standardization platform 102 provides the benefit of maximizing, or at least significantly increasing, the pool of training sets of information and compliance rules that might be utilized to train and/or otherwise configure the standardization model.

In some instances, to configure and/or otherwise train the standardization model, the standardization platform 102 may cause the standardization model to process the compliance rules and/or the training sets of information using one or more machine learning techniques. For example, the standardization platform 102 may cause the standardization model to process the compliance rules and/or the training sets of information by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

In some examples, in training and/or otherwise configuring the standardization model to perform encoding and decoding to achieve message standardization, based on input of message information, the standardization platform 102 may cause the standardization model to store one or more correlations based on the compliance rules and/or the training sets of information, and/or otherwise learn from the compliance rules and/or the training sets of information. By causing the standardization model to store the one or more correlations or otherwise learn from the compliance rules and/or the training sets of information, the standardization platform 102 may train the standardization model to selectively apply different encoding/decoding techniques based on the type, content, format, and/or other properties of message information provided as an input as described further herein depending on the compliance rule or compliance rules associated with the type, content, format, and/or other properties of the message information. For example, the standardization platform 102 may cause the standardization model to identify which compliance rules are associated with particular properties of message information, and/or to identify which encoding or decoding techniques most efficiently and/or most accurately ensure adherence with the compliance rules when transferring information associated with the particular properties.

By causing the standardization model to identify the plurality of categories of stored historical sample information, the standardization platform 102 may train and/or otherwise configure the standardization model to standardize message information according to one or more compliance rules when the message information is received as input by the standardization model. For example, the standardization platform 102 may train and/or otherwise configure the standardization model to process, access, and/or otherwise utilize the one or more stored correlations to identify techniques for encoding and/or decoding message information based on compliance rules corresponding to the message information. In some examples, the standardization platform 102 may train and/or otherwise configure the standardization model to generate and/or utilize algorithms, scores, or the like to identify the techniques (e.g., based on the stored correlations).

At step 204, the standardization platform 102 may establish a connection with the device 104. For example, the standardization platform 102 may establish a second wireless data connection with the device 104 to link the device 104 with the standardization platform 102 (e.g., in preparation for receiving message information, and/or to perform other functions). In some instances, the standardization platform 102 may identify whether or not a connection is already established with the device 104. If a connection is already established with the device 104, the standardization platform 102 might not re-establish the connection. If a connection is not yet established with the device 104, the standardization platform 102 may establish the second wireless data connection as described herein.

Figure 2B:
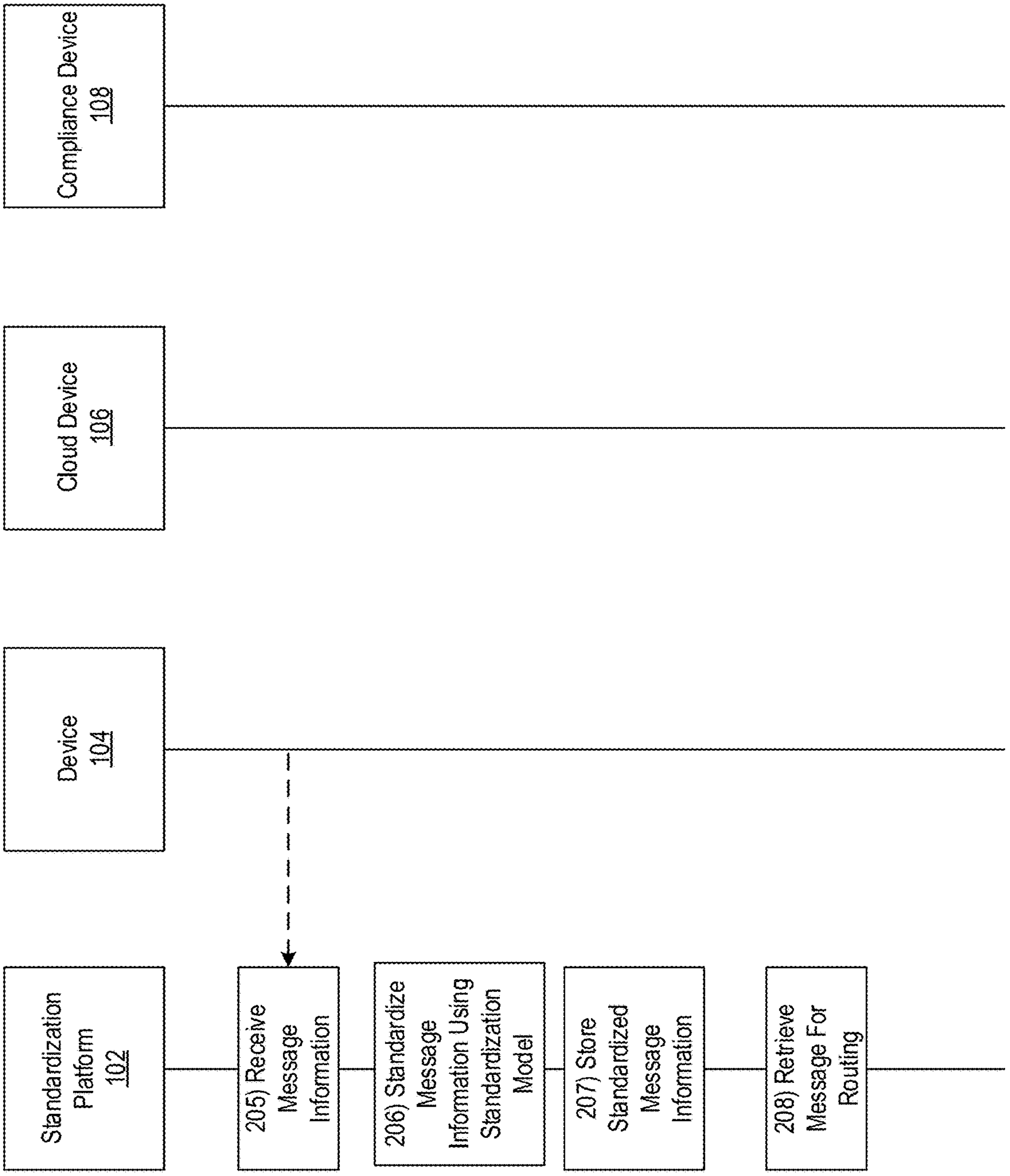

Referring to FIG. 2B, at step 205, the standardization platform 102 may receive message information. For example, the standardization platform 102 may receive message information from the device 104 and via the communication interface 113 while the second wireless data connection is established. The message information may be stored, prior to the standardization platform 102 receiving the message information, in a data lake or other repository corresponding to a particular enterprise, format, geographic region, and/or other properties. The message information may be and/or include event processing requests, records of completed event processing requests, and/or other information.

At step 206, the standardization platform 102 may standardize the message information. For example, the standardization platform 102 may standardize the message information by using the standardization model. In standardizing the message information, the standardization platform 102 may provide the message information to the standardization model as input. In some examples, the standardization platform 102 may additionally provide the compliance rules as input, and/or may have previously trained the standardization model based on the compliance rules (e.g., as described above at step 203).

In standardizing the message information, the standardization platform 102 may cause, based on providing the message information as input, the standardization model to encode and decode the message information to comply with standards for message transmission indicated by the compliance rules. For example, the standardization platform 102 may cause the standardization model to first encode the message information using one or more techniques that are considered acceptable for standardizing the message information based on the compliance rules and that are capable of placing the message information into a format suitable for a large language model. In some examples, the encoding techniques may include one-hot encoding, label encoding, ordinal encoding, binary encoding, frequency encoding, hashing, and/or other encoding techniques. In these examples, based on encoding the message information, the standardization platform 102 may cause the standardization model to process the message information to identify one or more decoding techniques that are considered acceptable for standardizing the message information based on the compliance rules and that are capable of converting the message information into a format suitable for storage at the standardization platform 102 (e.g., in cloud-based storage containers and/or other information repositories). The decoding techniques may include random sampling, search techniques, counterparts to particular encoding techniques, and/or any other decoding techniques. The standardization platform 102 may cause the standardization model to output, based on the input of the message information and application of the encoding and decoding techniques, standardized message information that satisfies the compliance rules and that is secured against attempts to breach conventional message or data security protocols.

In some examples, in standardizing the message information, the standardization platform 102 may cause the standardization model to identify the encoding techniques and/or the decoding techniques described herein based on the compliance rules. For example, the standardization platform 102 may cause the standardization model to identify the encoding techniques and/or the decoding techniques based on stored correlations used to train the standardization model (e.g., as described at step 203). In these examples, the standardization model may have previously stored one or more correlations between particular compliance rules and specific encoding and/or decoding techniques. For example, the standardization model may have previously stored a correlation between an encoding technique (e.g., hashing, and/or any other encoding technique), a compliance rule (e.g., a rule issued by a regulatory organization associated with storing a type or format of message information, and/or any other compliance rules), and/or a decoding technique (e.g., a technique for decoding hashed information into its original format, and/or any other decoding technique). It should be understood that any number of correlations may be stored between any number of encoding techniques, compliance rules, and/or decoding techniques as descried herein. In causing the standardization model to identify the encoding techniques and/or the decoding techniques based on the stored correlations, the standardization platform 102 may cause the standardization model to compare a portion of the message information to one or more stored correlations. For example, the standardization model may compare a particular record of an event processing request and/or other portions of the message information to stored correlations until the standardization model identifies a match between a property of the portion of the message information (e.g., the contents of the portion, an initial format of the portion, a source of the portion, and/or other properties) and an encoding technique and/or a decoding technique that satisfies a compliance rule corresponding to the portion of the message information.

In some instances, the standardization platform 102 may additionally or alternatively cause the standardization model utilize a score, algorithm, or the like to identify the encoding techniques and/or the decoding techniques and subsequently utilize the techniques to output the standardized message information. For example, the standardization platform 102 may cause the standardization model to generate a confidence score indicating a likelihood that a particular encoding technique and/or decoding technique satisfies a compliance rule associated with the message information. The standardization model may generate the confidence score based on a variety of factors, such as the stored correlations described herein. For example, based on identifying that 7 out of 10 stored correlations indicate an association between a first encoding technique and a compliance rule corresponding to the message information, the standardization model may assign the first encoding technique a confidence score of 0.7. In some examples, the standardization platform 102 may have previously trained the standardization model to use one or more large language machine learning algorithms (i.e., algorithms utilized by a large language model) to generate the confidence score. For example, the standardization platform 102 may have trained the standardization model to execute a confidence scoring algorithm using the following constraints/parameters:

$$\text{Confidence Score} = \left(\frac{\text{stored correlations matching compliance rule and technique}}{\text{total stored correlations}}\right) * n$$

In this example, n may be a normalization variable selected to scale the confidence score to align with one or more additional confidence scores generated using different large language machine learning algorithms (and, e.g., corresponding to different compliance rules and/or encoding/decoding techniques). It should be understood that this is merely an illustrative example of a score and/or algorithm. In some examples, the standardization model may utilize any other processing or analysis techniques within the capacity of a large language model to identify the encoding techniques and/or the decoding techniques before outputting the standardized message information.

At step 207, based on standardizing the message information, the standardization platform 102 may store the standardized message information. For example, the standardization platform 102 may store the standardized message information in a format which satisfies the compliance rules received at step 202 and which was achieved based on decoding techniques utilized by the standardization model. In storing the standardized message information, the standardization platform 102 may store the standardized message information in one or more cloud-based storage containers. The cloud-based storage containers may each be and/or include servers, clusters of repositories, nodes, and/or other components of the standardization platform 102 as described herein. The cloud-based storage containers may collectively provide router functionality to the standardization platform 102. For example, the cloud-based storage containers may route the stored standardization information, in a secure manner, through different servers, nodes, or the like associated with the standardization platform 102 during and/or for performance of functions described herein (e.g., at steps 208-213). In some examples, the standardization platform 102 may store different portions of the standardized message information in different cloud-based storage containers based on a domain type of each portion of the standardized message information and/or based on other properties of each portion of the standardized message information. For example, the standardization platform 102 may store portions of the standardized message information corresponding to a large data format in one or more cloud-based storage containers associated with the large data format. By storing the standardized message information in cloud-based storage containers based on domain type and/or other properties, the standardization platform 102 may provide advantages related to network compliance. For example, the standardization platform 102 may ensure that the standardized message information is stored according to network compliance rules associated with the storage of information within network 101, and/or other networks.

At step 208, the standardization platform 102 may retrieve a message. For example, the standardization platform 102 may retrieve a message (e.g., an event processing request, a record of an event processing request, or the like), included in the standardized message information, from a cloud-based storage container. The standardization platform 102 may retrieve the message based on a priority associated with the message, a delivery time associated with the message, and/or other parameters. In some examples, the standardization platform 102 may retrieve the message randomly. The standardization platform 102 may retrieve the message in order to route the message to a storage destination. It should be understood that, although an example of retrieving a single message is described, the standardization platform 102 may simultaneously or near-simultaneously retrieve any number of additional messages for performing the functions described herein.

Figure 2C:
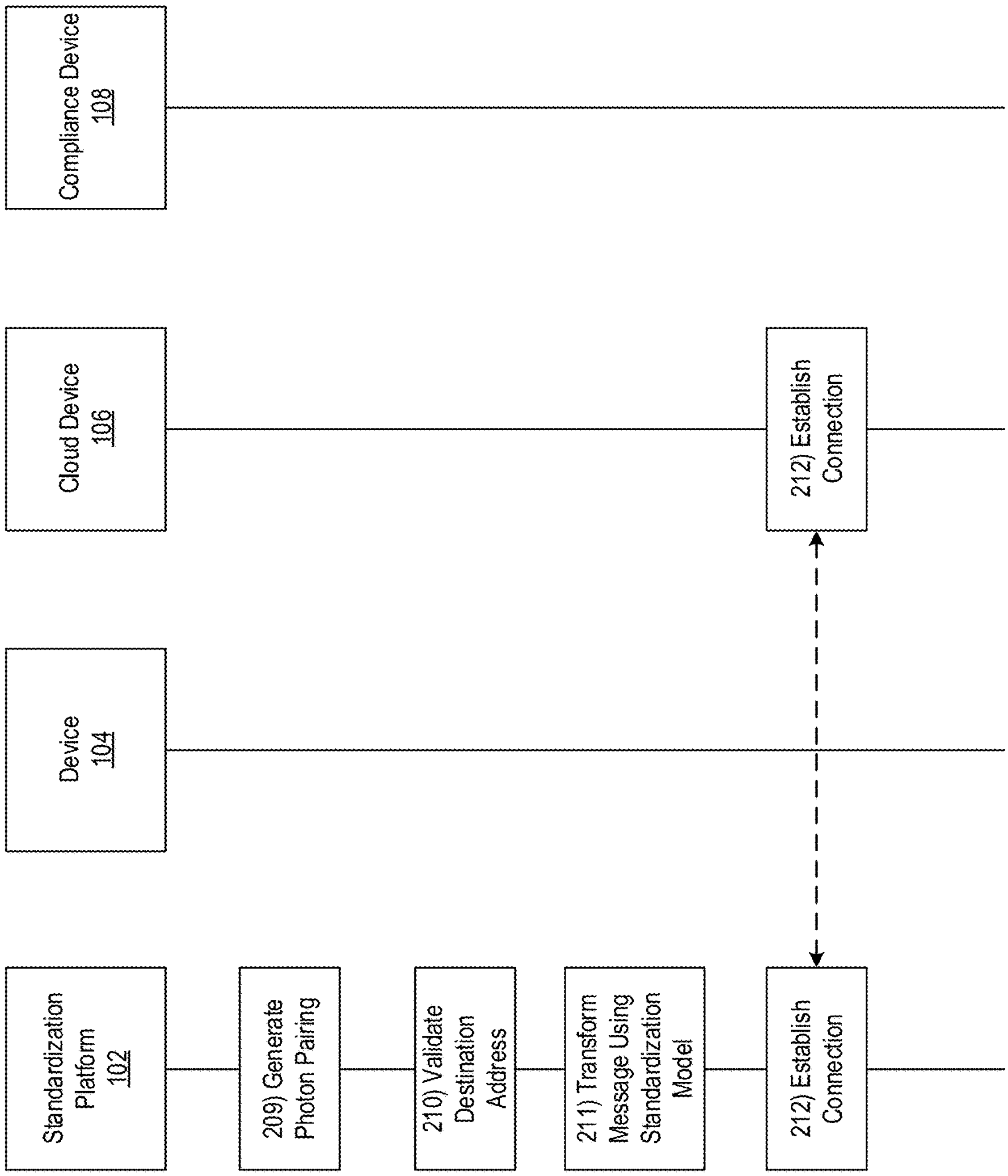
Figure 2D:
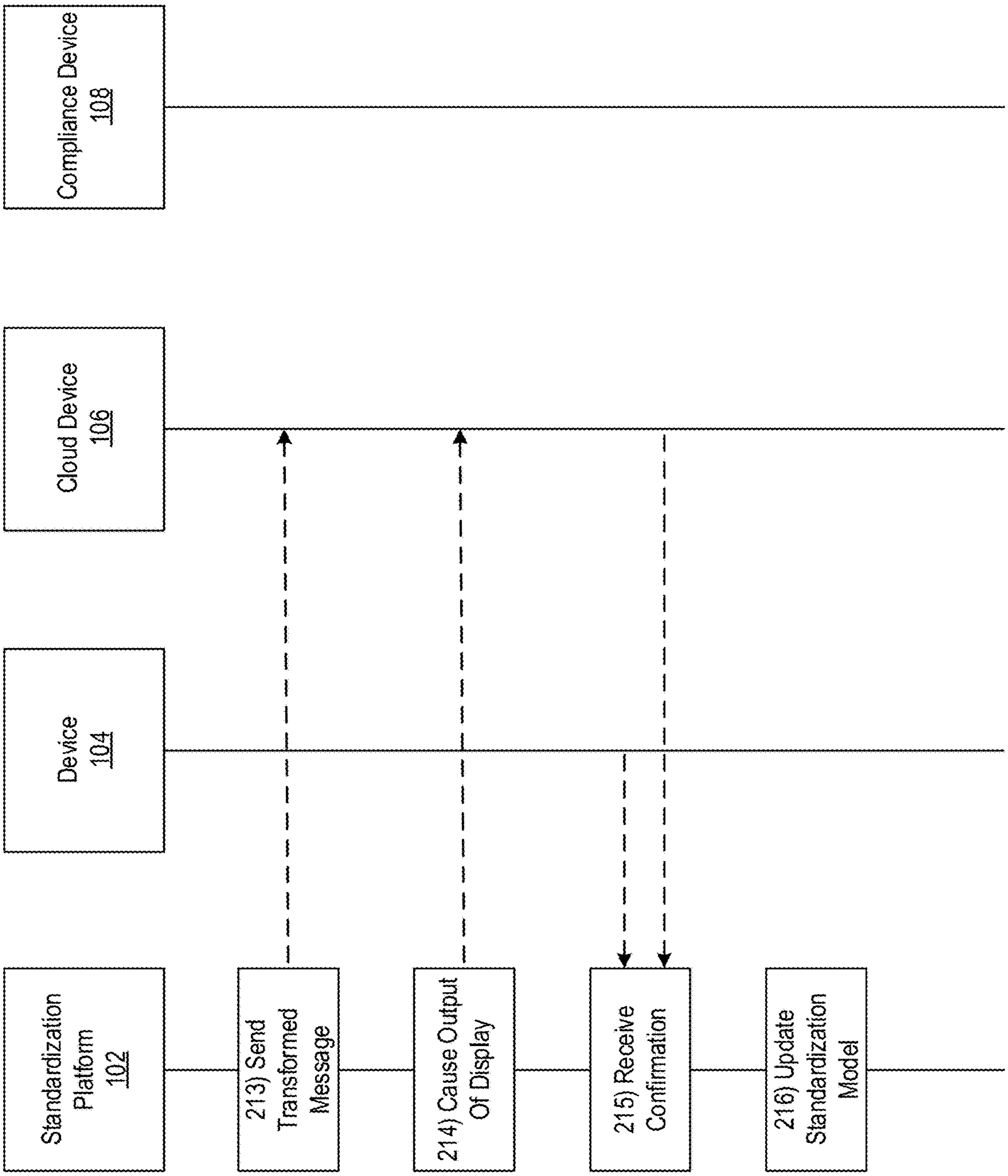

Referring to FIG. 2C, at step 209, the standardization platform 102 may generate a photon pairing. For example, the standardization platform 102 may generate a quantum-entangled photon pair representing a relationship between the message retrieved by the standardization platform 102 and a potential destination address (e.g., an IP address and/or other identification of a destination device) for the message. The photon pair may comprise a first photon associated with the message and a second photon, linked to the first photon, and associated with the potential destination address. The potential destination address may be one of a set of potential destination addresses stored in memory (e.g., memory 112, or the like).

In generating the photon pair, the standardization platform 102 may utilize a quantum search technique to identify, within the set of potential destination addresses, an optimal destination address for the message. For example, the standardization platform 102 may utilize a quantum search technique such as Grover's algorithm and/or other quantum search techniques (e.g., quantum search techniques associated with quantum machine learning) to identify a destination address (e.g., of a network from a set of networks in a distributed environment, and/or of a device from a set of devices in a distributed environment) that satisfies the compliance rules and any network standards associated with the network 101. By utilizing a quantum search technique, the standardization platform 102 may improve the efficiency of transmitting message information in a secure manner by reducing the time required to search through the set of potential destination addresses. The quantum search technique may be configured to identify a destination address that is secure for the type of information included in the message. For example, a compliance rule may require that information associated with a certain enterprise, task, or the like should be stored in a data lake or other repository that is free of information sourced from a different enterprise, task, or the like in order to maintain security. In these examples, the quantum search technique may identify a destination address of a device comprising a data lake or other repository associated with the same enterprise, task, or the like. The use of a quantum search technique, such as Grover's algorithm, improves message standardization and network standardization as described herein because it enables such techniques to be utilized in a multi-structured (i.e., distributed) environment in real-time.

At step 210, the standardization platform 102 may validate the destination address. For example, the standardization platform 102 may validate and/or otherwise confirm that the destination address associated with and/or otherwise indicated by the second photon in the photon pairing satisfies the compliance rules and is suitable for storing the content of the message, the format of the message, and/or for other properties of the message. To validate the destination address the standardization platform 102 may compare the destination address associated with the second photon against the compliance rules and/or against network standardization policies or policies associated with the standardization platform 102. In some examples, the standardization platform 102 may confirm that the destination address is associated with a device and/or a network corresponding to properties of the message and/or to an enterprise associated with the message. For example, the standardization platform 102 may confirm that the destination address is a device and/or network corresponding to messages associated with large data analytics, event streaming, federated queries, self-service analytics, and/or other properties or enterprises associated with message information corresponding to customers or employees of the enterprise associated with the standardization platform 102. In validating the destination address, the standardization platform 102 may utilize a validator. The validator may comprise a software system or program stored in memory 112 of the standardization platform 102. In some examples, based on determining that the destination address should not be validated, the standardization platform 102 may return to step 209 and generate a new photon pairing to identify a new destination address.

At step 211, the standardization platform 102 may transform the message. For example, the standardization platform 102 may transform the message using the standardization model. In transforming the message, the standardization platform 102 may transform (e.g., by decoding and encoding the message) the message to a format suitable for storage at the destination address (e.g., at the cloud device 106, and/or at other devices or networks). The standardization platform 102 may transform the message by providing the message as input into the standardization model. Based on inputting the message into the standardization model, the standardization platform 102 may cause the standardization model to decode the message from its current format (e.g., the format suitable for cloud storage in the cloud containers) and encode the message in the format suitable for storage at the destination address. The standardization platform 102 may cause the standardization model to perform the decoding and the encoding the based on the compliance rules. For example, the standardization platform 102 may cause the standardization model to identify the encoding techniques and/or the decoding techniques based on stored correlations used to train the standardization model (e.g., as described at step 203). The standardization platform 102 may cause the standardization model to identify and utilize the encoding techniques and/or the decoding techniques using the stored correlations, scores, algorithms, and/or other functions described herein at step 207. By using the standardization model to perform encoding and decoding of the message, and previously using the standardization model to perform encoding and decoding of the message information, the standardization platform 102 provides benefits such as ensuring interoperability between different device and networks in a distributed environment, such as local/on-premises storage devices (e.g., the device 104) and distributed cloud architectures (e.g., devices providing cloud storage, such as the cloud device 106).

At step 212, based on transforming the message, the standardization platform 102 may establish a connection with the cloud device 106. The standardization platform 102 may establish the connection with the cloud device 106 based on the destination address associated with the second photon of the photon pairing being an address of the cloud device 106. For example, the standardization platform 102 may establish a third wireless data connection with the cloud device 106 to link the cloud device 106 with the standardization platform 102 (e.g., in preparation for sending the message, causing display of a user interface, and/or to perform other functions). In some instances, the standardization platform 102 may identify whether or not a connection is already established with the cloud device 106. If a connection is already established with the cloud device 106, the standardization platform 102 might not re-establish the connection. If a connection is not yet established with the cloud device 106, the standardization platform 102 may establish the third wireless data connection as described herein Referring to FIG. 2D, at step 213, the standardization platform 102 may send the transformed message to the cloud device 106. For example, the standardization platform 102 may send the transformed message to the cloud device 106 via the communication interface 113 and while the third wireless data connection is established.

At step 214, the standardization platform 102 may cause output of a display (e.g., a user interface). For example, the standardization platform 102 may cause output of the display at the cloud device 106. In some examples, the standardization platform 102 may cause the output of the display by sending one or more messages or instructions directing the cloud device 106 and/or other devices to display a user interface. For example, the standardization platform 102 may send instructions directing the cloud device 106 to display a user interface for confirming that one or more event processing requests associated with the message have been processed.

Figure 3:
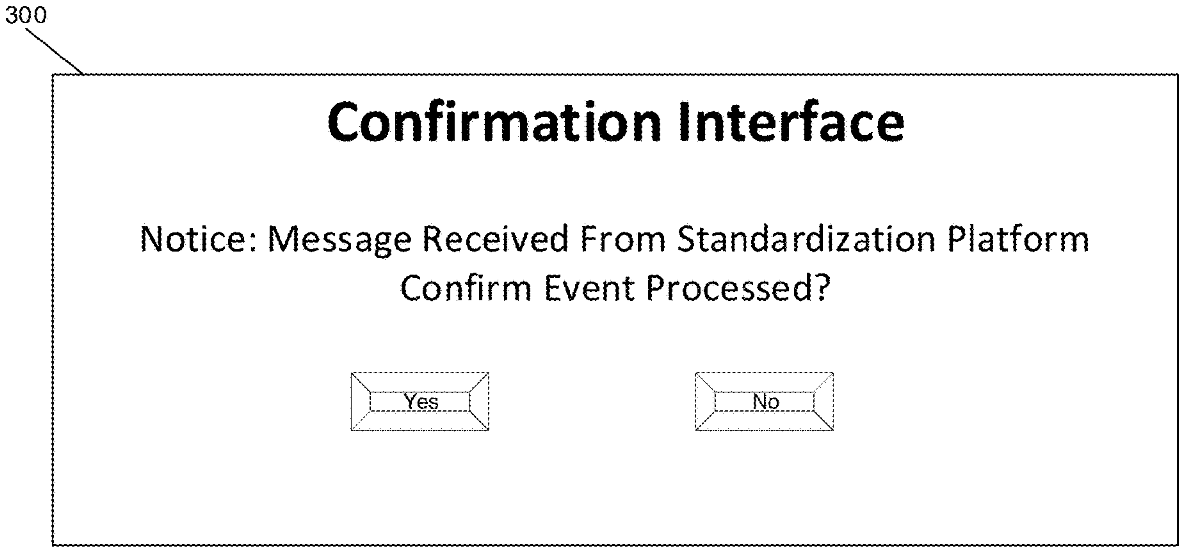
FIG. 3 depicts an illustrative graphical user interface generated as part of real-time secured dynamic information standardization in distributed environments using large language models in accordance with one or more example arrangements.

In causing display of the user interface, the standardization platform 102 may cause display of a graphical user interface similar to confirmation interface 300, which is illustrated in FIG. 3. For example, the standardization platform 102 may output one or more instructions (via the communication interface 113 and while the third wireless data connection is established) to the cloud device 106, causing the cloud device 106 to display the confirmation interface 300.

Referring to FIG. 3, in some instances, the confirmation interface 300 may include information requesting the user of the cloud device 106 to provide confirmation that an event processing request associated with the message was processed. For example, the confirmation interface 300 may include information such as a request for haptic input, vocal confirmation, electronic user input, and/or other information. The confirmation interface 300 may also display interface elements or selectable options requesting user input. For example, the confirmation interface 300 may display one or more of: an information entry field, a button or buttons, toggle or toggles, check box or boxes, and/or other interface elements. For example, as illustrated in FIG. 3, the interface elements may be one or more buttons the user might toggle or select to confirm that an event processing request associated with the message was processed (e.g., by the cloud device 106 storing the message, transmitting/sending the message to an additional destination, and/or performing other actions). In these examples, the cloud device 106 may provide the feedback to the standardization platform 102 and the standardization platform 102 may receive the user input/feedback (e.g., as a confirmation notification, as described herein with respect to step 215).

Referring again to FIG. 2D, at step 215, the standardization platform 102 may receive a confirmation notification. For example, the standardization platform 102 may receive a confirmation notification indicating whether the event processing request associated with the message was processed. The notification information may indicate whether the message was successfully and securely received and/or stored by the cloud device 106. The standardization platform 102 may receive the confirmation notice via the communication interface 113 and while the third wireless data connection is established, based on outputting the user interface.

At step 216, the standardization platform 102 may update the standardization model. For example, the standardization platform 102 may refine, validate, and/or otherwise update the standardization model based on receiving the confirmation notification and/or based on validating the destination address. In updating the validation model, the standardization platform 102 may refine, validate, and/or otherwise update the standardization model to improve the standardization model's performance of functions as described herein. For example, the standardization platform 102 may provide additional training input to the standardization model based on the confirmation notification and/or based on validating the destination address. The standardization model may use machine learning techniques to modify its behaviors, algorithms, or the like based on the additional training input. For example, the standardization platform 102 may provide additional training input that includes additional or updated compliance rules received by the standardization platform 102 and/or updated by the standardization platform 102 in response to the destination address failing to be validated. Additionally or alternatively, the standardization platform 102 may provide additional training input that includes the confirmation notification and/or information indicating whether the event processing request associated with the message was processed. If the event processing request was not processed (e.g., based on a failure to adhere to compliance rules and/or network standardization protocols or policies), the standardization platform 102 may cause the standardization model to update behaviors, algorithms, or the like used to identify encoding techniques and/or decoding techniques to improve the performance of the standardization model in providing secure real-time secured dynamic information standardization. If the event processing request was processed, the standardization platform 102 may cause the standardization model to reinforce behaviors, algorithms, or the like used to identify encoding techniques and/or decoding techniques to improve the performance of the standardization model in providing secure real-time secured dynamic information standardization. By inputting the confirmation notification and/or information indicating whether the event processing request was processed into the standardization model, the standardization platform 102 may create and/or update an iterative feedback loop that may continuously and dynamically refine the standardization model to improve its accuracy in identifying and using encoding techniques and/or decoding techniques. In some instances, updating the standardization model may include causing the standardization model to update or add one or more stored correlations. For example, the standardization platform 102 may cause the standardization model to store new correlations and/or update existing correlations, based on the additional training input, such that the standardization model may more accurately identify optimal encoding techniques and/or decoding techniques in future iterations of the feedback loop.

In updating the standardization model, the standardization platform 102 may improve the accuracy of the model for identifying and using encoding techniques and/or decoding techniques and therefore also improve the accuracy of the model in adhering to compliance rules and/or network standardization protocols or policies which may, for example, result in more efficient training of machine learning models trained by the standardization platform 102 (and may in some instances, conserve computing and/or processing power/resources in doing so). The improvements to the accuracy of the model may also provide improvements to the security of the network 101 and/or the transmission of information from the device 104 to the cloud device 106 and/or other devices in the distributed environment by increasing the likelihood of the most secure encoding techniques and/or decoding techniques being selected by the standardization model.

Figure 4:
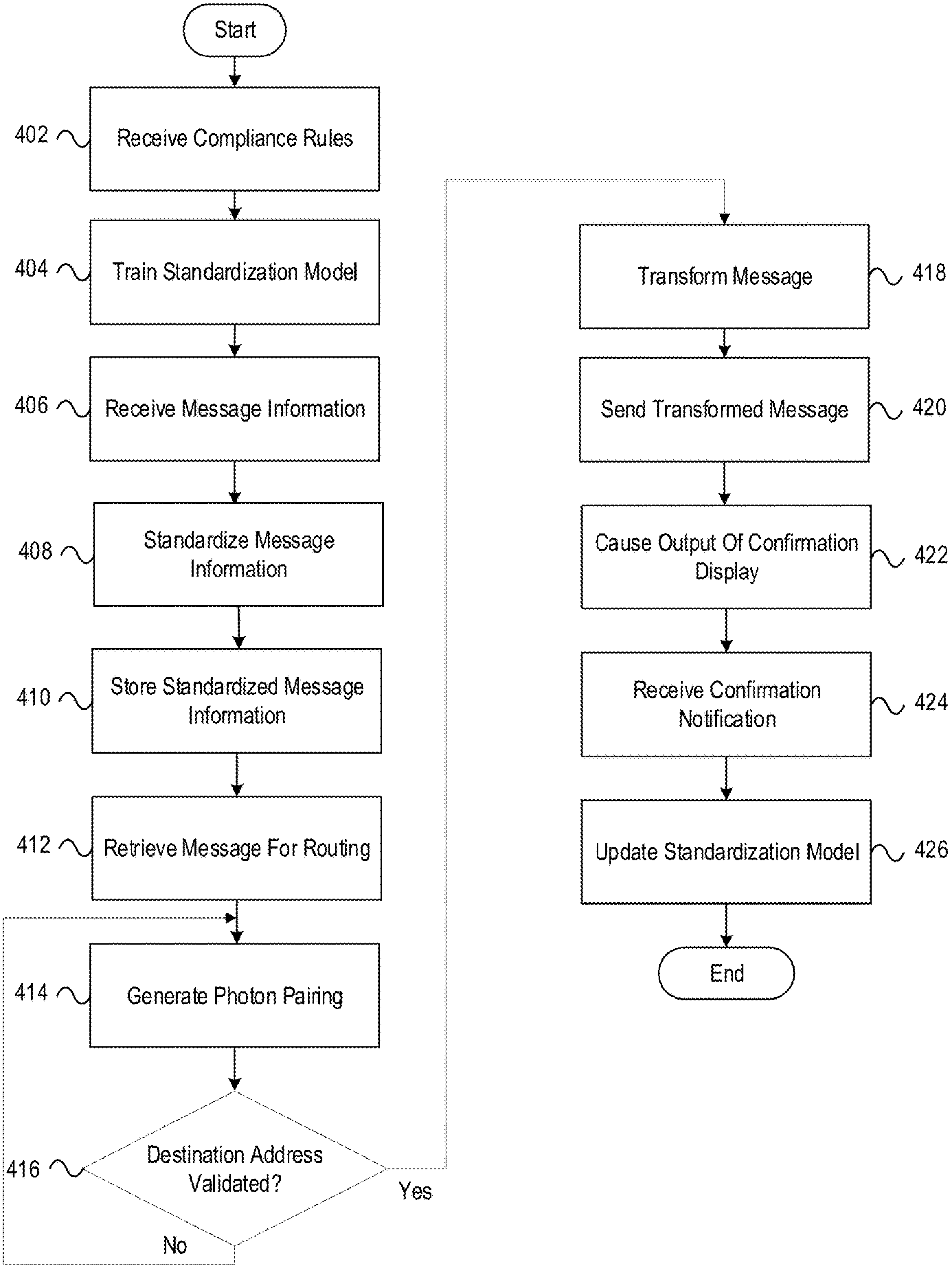
FIG. 4 depicts an illustrative method for real-time secured dynamic information standardization in distributed environments using large language models in accordance with one or more example arrangements.

FIG. 4 depicts an illustrative method for real-time secured dynamic information standardization in distributed environments using large language models in accordance with one or more example arrangements. Referring to FIG. 4, at step 402, a computing platform having at least one processor, a communication interface, and memory may receive compliance rules. At step 404, the computing platform may train a standardization model. For example, the computing platform may train a large language model as a standardization model to perform encoding and decoding to achieve message standardization. At step 406, the computing platform may receive message information. At step 408, the computing platform may standardize the message information. For example, the computing platform may standardize the message information by using the standardization model. At step 410, the computing platform may store the standardized message information. For example, the computing platform may store the standardized information in cloud-based storage containers. At step 412, the computing platform may retrieve a message for routing. At step 414, the computing platform may generate a photon pairing for the message.

At step 416, the computing platform may identify whether a destination address should be validated. For example, the computing platform may perform validation of a photon corresponding to the destination address to identify whether the destination address should be validated. Based on identifying that the destination should not be validated, the computing platform may return to step 414 and generate a new photon pairing. Based on validating the destination address, the computing platform may proceed to step 418. At step 418, the computing platform may transform a message. At step 420, the computing platform may send the transformed message to a destination address. At step 422, the computing platform may cause output of a confirmation display (e.g., a user interface requesting user feedback). At step 424, the computing platform may receive a confirmation notification. At step 426, the computing platform may update the standardization model. For example, the computing platform may update the standardization model based on the confirmation notification.

One or more aspects of the disclosure may be embodied in computer-usable data or computer-executable instructions, such as in one or more program modules, executed by one or more computers or other platforms to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, configure the computing platform to:

receive, from a compliance device, compliance information comprising a plurality of rules for message standardization;

train, based on the compliance information and one or more large language model training sets, a standardization model to standardize inputted message information;

receive, from a first device, message information comprising records of one or more event processing requests;

based on inputting the message information into the standardization model, standardize the message information by causing the standardization model to encode and decode the message information;

store, in one or more cloud-based storage containers, the standardized message information;

retrieve, from the one or more cloud-based storage containers, a message for routing to a destination;

generate a photon pairing for the message, wherein the photon pairing comprises a first photon corresponding to the message and a second photon corresponding to a destination of the message;

validate, based on the photon pair, the destination of the message;

transform, using the standardization model, the message, wherein transforming the message comprises encoding the message in a format for the destination of the message;

send, to the destination of the message, the message; and update, based on sending the message, the standardization model.

2. The computing platform of claim 1, wherein the memory stores additional computer-readable instructions, that when executed by the at least one processor, further configure the computing platform to:

cause, based on sending the message, output of a display; and receive, based on the output of the display, a confirmation notification for an event processing request associated with the message, wherein the updating the standardization model is based on the confirmation notification.

3. The computing platform of claim 1, wherein the first device comprises a data lake located at a premises of the computing platform.

4. The computing platform of claim 1, wherein the destination of the message comprises a cloud data lake.

5. The computing platform of claim 1, wherein the instructions, when executed by the at least one processor, configure the computing platform to generate the photon pairing based on executing a quantum search algorithm.

6. The computing platform of claim 1, wherein the instructions, when executed by the at least one processor, configure the computing platform to generate the photon pairing by identifying, from a set of networks in a distributed environment, a network destination matching a set of compliance rules corresponding to a domain type of the message.

7. The computing platform of claim 1, wherein the instructions, when executed by the at least one processor, configure the computing platform to validate the destination of the message by confirming whether transfer of a message from the first device to the destination of the message complies with a network standardization protocol.

8. The computing platform of claim 1, wherein transforming the message further comprises decoding, from a cloud storage format and prior to the encoding in the format for the destination of the message, the message.

9. The computing platform of claim 1, wherein the instructions, when executed by the at least one processor, configure the computing platform to store the standardized message information in the one or more cloud-based storage containers based on one or more domain types corresponding to the standardized message information.

10. A method comprising:

at a computing platform comprising at least one processor, a communication interface, and memory:

receiving, from a compliance device, compliance information comprising a plurality of rules for message standardization;

training, based on the compliance information and one or more large language model training sets, a standardization model to standardize inputted message information;

receiving, from a first device, message information comprising records of one or more event processing requests;

based on inputting the message information into the standardization model, standardizing the message information by causing the standardization model to encode and decode the message information;

storing, in one or more cloud-based storage containers, the standardized message information;

retrieving, from the one or more cloud-based storage containers, a message for routing to a destination;

generating a photon pairing for the message, wherein the photon pairing comprises a first photon corresponding to the message and a second photon corresponding to a destination of the message;

validating, based on the photon pair, the destination of the message;

transforming, using the standardization model, the message, wherein transforming the message comprises encoding the message in a format for the destination of the message;

sending, to the destination of the message, the message; and updating, based on sending the message, the standardization model.

11. The method of claim 10, further comprising:

causing, based on sending the message, output of a display; and receiving, based on the output of the display, a confirmation notification for an event processing request associated with the message, wherein the updating the standardization model is based on the confirmation notification.

12. The method of claim 10, wherein the first device comprises a data lake located at a premises of the computing platform.

13. The method of claim 10, wherein the destination of the message comprises a cloud data lake.

14. The method of claim 10, wherein the generating the photon pairing comprises executing a quantum search algorithm.

15. The method of claim 10, wherein the generating the photon pairing comprises identifying, from a set of networks in a distributed environment, a network destination matching a set of compliance rules corresponding to a domain type of the message.

16. The method of claim 10, wherein the validating the destination of the message comprises confirming whether transfer of a message from the first device to the destination of the message complies with a network standardization protocol.

17. The method of claim 10, wherein transforming the message further comprises decoding, from a cloud storage format and prior to the encoding in the format for the destination of the message, the message.

18. The method of claim 10, wherein the storing the standardized message information in the one or more cloud-based storage containers is based on one or more domain types corresponding to the standardized message information.

19. One or more non-transitory computer-readable media storing instructions that, when executed by a computing platform comprising at least one processor, a communication interface, and memory, configure the computing platform to:

receive, from a compliance device, compliance information comprising a plurality of rules for message standardization;

train, based on the compliance information and one or more large language model training sets, a standardization model to standardize inputted message information;

receive, from a first device, message information comprising records of one or more event processing requests;

based on inputting the message information into the standardization model, standardize the message information by causing the standardization model to encode and decode the message information;

store, in one or more cloud-based storage containers, the standardized message information;

retrieve, from the one or more cloud-based storage containers, a message for routing to a destination;

generate a photon pairing for the message, wherein the photon pairing comprises a first photon corresponding to the message and a second photon corresponding to a destination of the message;

validate, based on the photon pair, the destination of the message;

transform, using the standardization model, the message, wherein transforming the message comprises encoding the message in a format for the destination of the message;

send, to the destination of the message, the message; and update, based on sending the message, the standardization model.

20. The one or more non-transitory computer-readable media of claim 19, storing additional instructions that, when executed by the computing platform, further configure the computing platform to:

cause, based on sending the message, output of a display; and receive, based on the output of the display, a confirmation notification for an event processing request associated with the message, wherein the updating the standardization model is based on the confirmation notification.

* * * * *